(12) United States Patent
Lennings et al.

(10) Patent No.: US 11,058,210 B2
(45) Date of Patent: Jul. 13, 2021

(54) PIVOTAL CARRIER ASSEMBLY FOR A HARNESS

(71) Applicant: Globe (Jiangsu) Co., Ltd., Changzhou (CN)

(72) Inventors: Eric Lennings, Huskvarna (SE); Emma Ekberg, Goeteborg (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 16/651,224

(22) PCT Filed: Sep. 27, 2017

(86) PCT No.: PCT/CN2017/103740
§ 371 (c)(1),
(2) Date: Mar. 26, 2020

(87) PCT Pub. No.: WO2019/061093
PCT Pub. Date: Apr. 4, 2019

(65) Prior Publication Data
US 2020/0275763 A1   Sep. 3, 2020

(51) Int. Cl.
*A45F 3/14* (2006.01)
*A45F 3/10* (2006.01)
*A45F 5/00* (2006.01)
*F16M 13/04* (2006.01)
*F16M 13/00* (2006.01)
*A45F 3/00* (2006.01)

(52) U.S. Cl.
CPC ............... *A45F 3/14* (2013.01); *A45F 5/00* (2013.01); *F16M 13/00* (2013.01); *F16M 13/04* (2013.01); *A45F 3/10* (2013.01); *A45F 2003/003* (2013.01); *A45F 2003/142* (2013.01); *A45F 2003/146* (2013.01); *A45F 2200/0575* (2013.01)

(58) Field of Classification Search
CPC ........ A45F 3/14; A45F 2003/146; A45F 5/14; A45F 3/10; F16M 13/04
See application file for complete search history.

(56) References Cited

U.S. PATENT DOCUMENTS 4,303,186 A   12/1981 Ollinger, IV
D329,210 S *  9/1992 Cullmann .................... D11/216
(Continued)

FOREIGN PATENT DOCUMENTS

CN   201482099 U   5/2010
CN   202286808 U   7/2012
(Continued)

OTHER PUBLICATIONS

Search Report and Written Opinion in related International Patent Application No. PCT/CN2017/103740 dated Jul. 18, 2018; 10 pages.

*Primary Examiner* — Justin M Larson
(74) *Attorney, Agent, or Firm* — Rooney IP, LLC

(57) ABSTRACT

A carrier assembly for a harness for carrying a handheld motor-driven work tool, the carrier assembly including a back plate having connections for shoulder straps, a hip belt, and a manner for attaching the work tool. The back plate is arranged to be connected to the hip belt by a pivotal connection joint to allow rotation about an axis substantially perpendicular to a plane defined by the back plate.

11 Claims, 4 Drawing Sheets

(56) References Cited

U.S. PATENT DOCUMENTS

| | | | | |
|---|---|---|---|---|
| 5,609,278 | A * | 3/1997 | Fresco | A45F 3/04 224/153 |
| 5,806,741 | A * | 9/1998 | Kirk | A45F 5/00 224/634 |
| 5,823,414 | A * | 10/1998 | Gal | A45F 3/04 224/637 |
| 5,860,769 | A * | 1/1999 | Seligman | A44B 11/263 224/264 |
| 5,954,250 | A | 9/1999 | Hall et al. | |
| 6,079,602 | A * | 6/2000 | Howell | A45F 3/047 224/262 |
| 6,168,881 | B1 * | 1/2001 | Fischer | B25F 5/02 429/97 |
| D447,088 | S * | 8/2001 | Anscher | D11/216 |
| D447,979 | S * | 9/2001 | Anscher | D11/216 |
| 6,290,111 | B1 * | 9/2001 | Hedenberg | A45F 3/10 224/262 |
| 6,321,959 | B1 * | 11/2001 | Howell | A45F 3/047 224/262 |
| 6,848,120 | B2 * | 2/2005 | Kling | A62B 9/04 2/2.15 |
| D565,461 | S * | 4/2008 | Johnson | D11/200 |
| 7,770,766 | B2 * | 8/2010 | Foissac | A45F 3/047 224/262 |
| 8,182,439 | B2 * | 5/2012 | Glenn | F41H 1/02 602/19 |
| 8,312,600 | B2 * | 11/2012 | Colorado | A62B 9/04 24/3.7 |
| 8,714,424 | B2 * | 5/2014 | Oddou | A45F 3/04 224/262 |
| 8,857,681 | B2 * | 10/2014 | Burnett | A44B 11/005 224/197 |
| 8,991,671 | B2 * | 3/2015 | Gill | A45F 3/08 224/628 |
| 9,220,333 | B2 * | 12/2015 | Losos | A45F 3/10 |
| 9,603,393 | B2 * | 3/2017 | Crye | A45F 3/06 |
| 9,700,122 | B2 * | 7/2017 | Pelland | A41D 13/0518 |
| 9,801,453 | B2 * | 10/2017 | Hoag | A45F 3/10 |
| 9,820,555 | B2 * | 11/2017 | Beck | A45F 3/14 |
| 10,004,320 | B2 * | 6/2018 | Reid | A45F 3/047 |
| 10,028,570 | B2 * | 7/2018 | Beck | A45F 3/14 |
| 10,137,319 | B2 * | 11/2018 | Carr | A45F 3/10 |
| 10,230,077 | B2 * | 3/2019 | Rief | A45F 3/04 |
| D849,332 | S * | 5/2019 | Ekberg | D29/124 |
| 10,288,384 | B2 * | 5/2019 | Kinnings | A45F 3/12 |
| D853,276 | S * | 7/2019 | Ekberg | D11/216 |
| 10,368,626 | B2 * | 8/2019 | Roque | A45F 3/04 |
| 10,383,426 | B2 * | 8/2019 | Rittenhouse | A45F 3/10 |
| 10,569,108 | B2 * | 2/2020 | Farnaby | A45F 3/047 |
| RE48,093 | E * | 7/2020 | Hairston | A45F 3/04 |
| 10,716,388 | B2 * | 7/2020 | Pellenc | A45F 5/00 |
| 2011/0108595 | A1 * | 5/2011 | Hoag | A45F 3/10 224/633 |
| 2012/0192335 | A1 * | 8/2012 | Crye | A41D 13/0007 2/102 |
| 2014/0151424 | A1 * | 6/2014 | Hexels | A45F 3/06 224/637 |
| 2014/0345604 | A1 | 11/2014 | Wang et al. | |
| 2015/0320150 | A1 * | 11/2015 | Beck | A41F 17/00 24/647 |
| 2015/0320182 | A1 * | 11/2015 | Beck | A44B 13/0029 24/644 |
| 2016/0106199 | A1 * | 4/2016 | Hairston | A45F 3/14 224/633 |
| 2016/0255942 | A1 | 9/2016 | Wagner et al. | |
| 2020/0103073 | A1 * | 4/2020 | Lennings | A45F 3/14 |
| 2020/0178677 | A1 * | 6/2020 | Lennings | A45F 3/14 |
| 2020/0275763 | A1 * | 9/2020 | Lennings | A45F 5/00 |
| 2020/0323312 | A1 * | 10/2020 | Lennings | A45F 3/04 |

FOREIGN PATENT DOCUMENTS

| | | |
|---|---|---|
| CN | 102771994 A | 11/2012 |
| WO | 2013139371 A1 | 9/2013 |

* cited by examiner

PIVOTAL CARRIER ASSEMBLY FOR A HARNESS

TECHNICAL FIELD

The present invention relates generally to a carrier assembly for a harness for carrying a hand-held motor-driven tool such as a clearing saw, the carrier assembly comprising a back plate including connections for shoulder straps, a hip belt, and means for attaching the work tool.

BACKGROUND ART

There is a wide variety of clearing saws and brush cutters in use in modern forestry and garden maintenance. This type of equipment is intended to be handled by one person alone, and since the equipment could be quite heavy and its vibrations and the possible counter forces, caused by the branches being cut, have to be considered, one readily realizes the need for some sort of harness to aid the operator in carrying the weight of the equipment.

The simplest type of harness consists of a single band, which is worn by the operator over one shoulder and across the back and chest respectively, to support the equipment at hip level. While this solution is sufficient for lighter equipment which is used seldom and during short periods of time, it is not adequate for professional operators who use the equipment for days on end. As the clearing saws are usually designed for use on one side of the operator's body, the load will always be carried on one and the same shoulder, which could cause strain in the operator's body in the long run. A better type of harness comprises one shoulder strap over each shoulder, a waist belt, a side strap, and a back plate to which all straps are connected. Quite often a shock-absorbing hip-pad is attached as well, against which a part of the equipment is supported during use. The different straps may be adjusted to the size of the operator. However, there remain some problems with an uneven load on the operator, especially when working in dense bushes or forests, where the operator is moving and has to repeatedly bend over sideways to avoid branches and twigs. The back plate will hold the shoulder straps at approximately the same level, although one shoulder on the operator is noticeably lower than the other. The shoulder on the higher level will receive more of the load from the equipment.

Another disadvantage with the latter type of harness is that by adjusting the shoulder straps to accommodate very tall or short operators, the comfort and weight-distributing performance of the harness is compromised. For a tall operator, the shoulder straps may have to be maximally extended, which renders the harness more unstable, and for a short operator there is the risk that the waist belt will be placed too low on the body, which is uncomfortable, and may give a suboptimal weight distribution.

WO 2008/147256 discloses an adjustable harness for evenly distributing the weight of the equipment during use having a back plate comprising two rigid plate portions connected to each other to allow mutual rotation in a plane defined by the back plate. The connection is of a snap-fit type where a central boss on the upper plate portion fits into one of three holes on the lower plate portion. The holes are placed at different distances from the bottom of the lower plate portion corresponding to three different sizes of the back plate. However, movement of the operator is still limited by the proposed solution in WO 2008/147256.

SUMMARY OF INVENTION

An object of the present invention is to provide an improved carrier assembly for a harness which allows increased freedom of movement to enhance the ergonomic properties of the harness. This object is now achieved by a carrier assembly for carrying a handheld motor-driven work tool according to a first aspect of the present invention, the carrier assembly comprising a back plate including connections for shoulder straps, a hip belt, and means for attaching the work tool, characterized in that the back plate is arranged to be connected to the hip belt by means of a pivotal connection joint to allow rotation about an axis substantially perpendicular to a plane defined by the back plate.

The carrier assembly provides a pivotal connection joint between the back plate and the hip belt giving the operator an increased degree of freedom to move whilst maintaining an optimal weight distribution of the work tool. The pivotal connection joint is arranged at the level of the hip belt, i.e. in a region of the back of the operator which naturally is more flexible and allows for increased movement in a lateral direction.

In a preferred embodiment, the back plate comprises a recess defining a cavity adapted to receive a corresponding tongue-shaped member arranged on the hip belt. The cavity provides a seating for the tongue-shaped member of the hip belt to guide and ensure smooth pivotal motion between the back plate and the hip belt.

In an advantageous embodiment, the recess is arranged in a lower portion of the back plate and has an opening facing towards the tongue-shaped member on the hip belt. By providing the opening facing the tongue-shaped member of the hip belt, i.e. downwards when the back plate is in an upright position, the tongue-shaped member can be slid into the recess in a quick and easy manner, simply by moving the back plate and hip belt towards each other in a direction parallel to the plane defined by the back plate.

In an alternative embodiment, the recess further comprises a hole adapted to receive a corresponding protruding boss arranged on a resilient tab on the tongue-shaped member in a snap-fit connection, wherein the back plate is arranged to pivot about the boss on the resilient tab. Preferably, the hole in the recess has a substantially circular shape and the resilient tab has a corresponding substantially circular shape. In use when the tongue-shaped member is accommodated in the recess, the resilient tab protrudes through the hole to provide a simple but strong pivotal connection joint. The mating circular shapes of the hole and the boss provides smooth pivotal movement of the pivotal connection joint.

In a further preferred embodiment, the resilient tab is biased such that the boss protrudes in a direction substantially perpendicular to a plane defined by the tongue-shaped member. Preferably, the resilient tab is formed by a through-going slit in the tongue-shaped member. The slit may be circular in shape to at least partially define the circumference of the tab.

In an alternative embodiment, a top surface of the boss is slanted downwardly in an insertion direction of the tongue-shaped member into the recess. In other words, the top surface is angled such that the thickness of the boss tapers in the insertion direction, that is towards the end of the tongue-shaped member facing the recess in the back plate. The slanted surface facilitates smooth insertion and enables the boss on the resilient tab to spring back into locking engagement with the hole in the recess once it passes the lower rim of the hole.

In a preferred embodiment, the recess is dimensioned to allow pivotal movement of the tongue-shaped member in the range ±15°, preferably ±10°-15 with respect to a central position. The range of pivotal movement is adapted to provide an ergonomic limit to the operator.

In an advantageous embodiment, the tongue-shaped member is fastened to the hip belt by means of any one of welding, gluing, sewing, riveting and stapling. Preferably, the tongue-shaped member is fastened to the hip belt underneath a panel such that the pivotal connection joint is hidden from view. The fastening and placement of the tongue-shaped member on the hip belt provides a durable design and protects the pivotal connection joint.

In an advantageous embodiment, the pivotal connection joint between the back plate and the hip belt is releasable. The releasable connection joint enables the operator to remove the back plate and only use the hip belt.

In a second aspect of the present invention, there is provided a harness comprising a carrier assembly according to the first aspect.

BRIEF DESCRIPTION OF DRAWINGS

The invention is now described, by way of example, with reference to the accompanying drawings, in which.

DESCRIPTION OF EMBODIMENTS

Figure 1A:
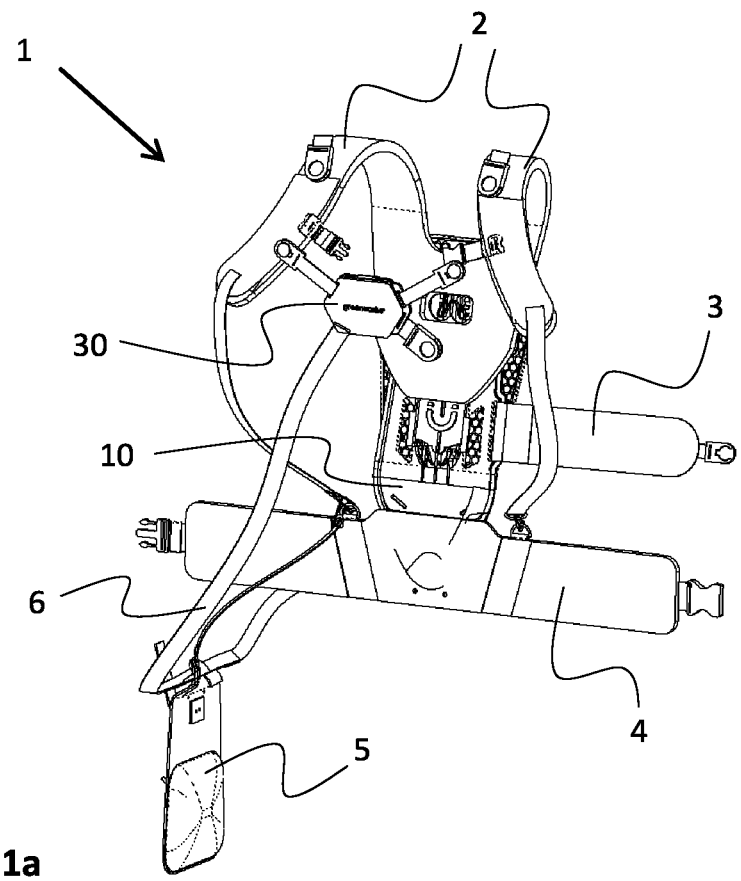
FIGS. 1a and 1b show front and rear perspective views, respectively, of an exemplary harness comprising a carrier assembly according to the present invention.

In the following, a detailed description of a carrier assembly according to the invention is presented. In the drawing figures, like reference numerals designate identical or corresponding elements throughout the several figures. It will be appreciated that these figures are for illustration only and are not in any way to be seen as restricting the scope of the invention.

In the context of the present invention, the terms 'front' and 'rear' shall be interpreted in relation to the operator when wearing the harness including the carrier assembly. Thus, surfaces facing in the forward direction of the operator shall be designated rear faces and surfaces facing in the opposite, backward direction of the operator shall be designated rear faces.

Figure 1B:
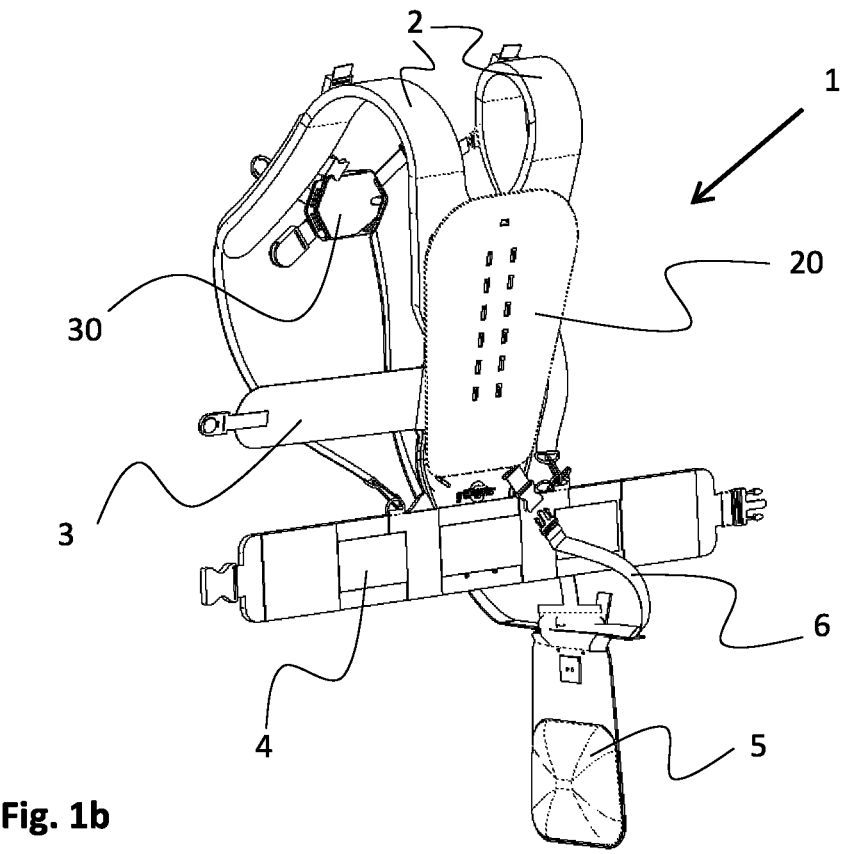

FIGS. 1a and 1b show in perspective views the front and rear of an exemplary harness 1 for carrying a handheld, motor-driven power tool (not shown) of the kind described in the introductory portion, which may be used together with a carrier assembly according to the present invention. The harness 1 comprises a pair of shoulder straps 2 to be worn on the shoulders by the operator. The shoulder straps 2 are connected to a back plate 10. Further, on one side of the back plate 10 there is attached a side strap 3 for providing additional stability and support when carrying the power tool. In a bottom portion of the back plate 10, a hip belt 4 is attached to be worn around the hips by the operator. As will be explained more in detail below, the connection between the back plate 10 and the hip belt 4 is achieved by means of a pivotal connection joint which allows movement of the back plate 10 with respect to the hip belt 4.

On the opposite side of the side strap 3, there is provided a hip plate 5 comprising means (not shown) for attaching the power tool. The hip plate 5 is connected to the harness 1 by means of strap 6, which attaches to the back plate 10 on the rear face of the harness 1, as shown in FIG. 1b. On the rear face of the harness 1, there is provided a chest buckle 30 arranged for attachment of the strap 6 for the hip plate 5, the side strap 3 and connecting straps to the shoulder straps 2 to keep the harness 1 in place on the body of the operator during use and allow for distribution of forces caused by the weight of the power tool.

The harness 1 is designed to provide a comfortable fit for the operator, distribute the forces caused by the weight of the power tool and allow freedom of movement for the operator during operation of the power tool.

Figure 2:
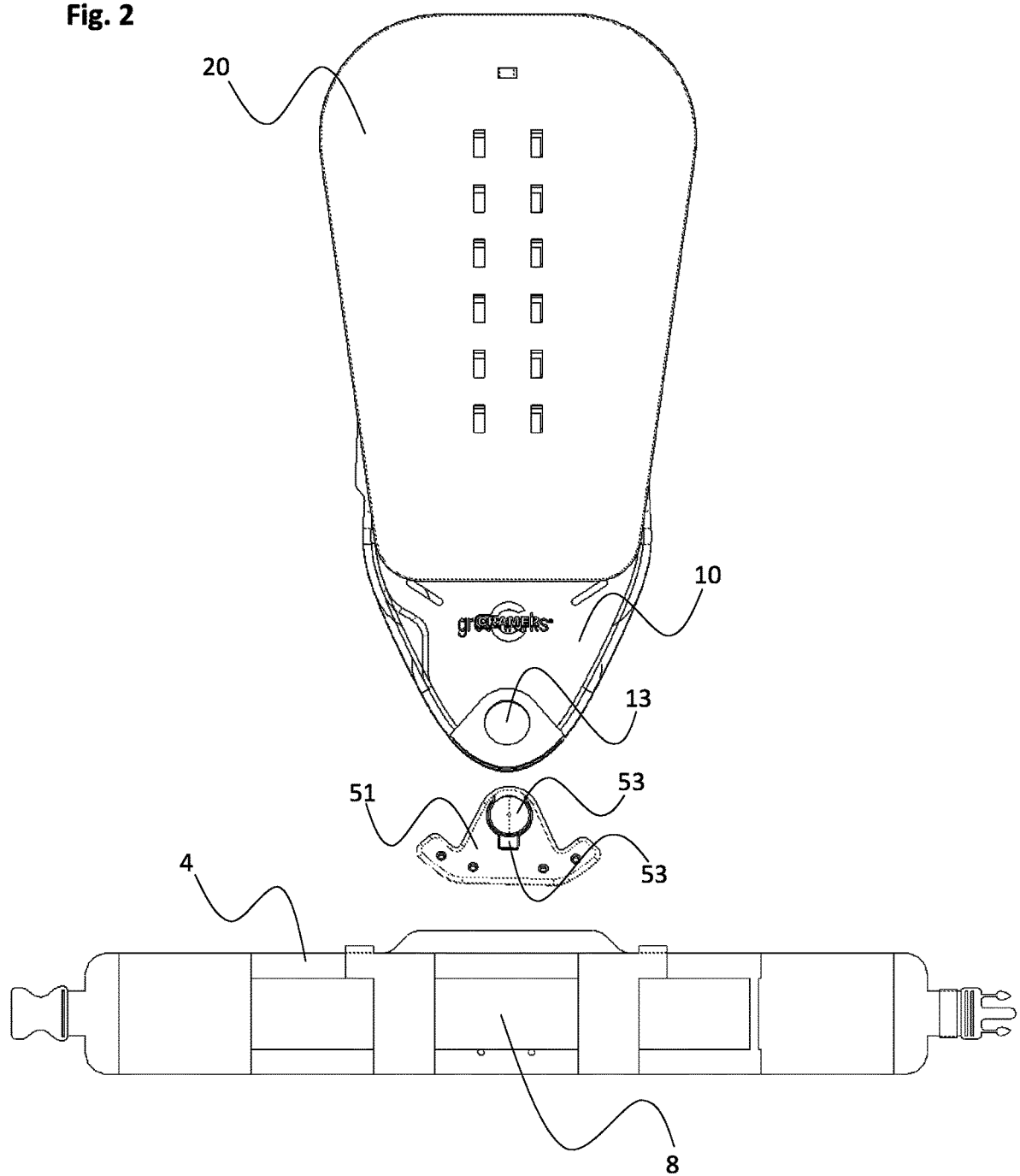
FIG. 2 shows an exploded face view of a carrier assembly according to the present invention

As mentioned above, one of the objects of the present invention is to provide an improved carrier assembly for a harness which allows increased freedom of movement to enhance the ergonomic properties of the harness. To this end, a carrier assembly for a pivotal connection between the back plate 10 and the hip belt 4 is provided. In FIG. 2, an exploded view of the carrier assembly is illustrated which includes from top to bottom a back plate 10, a tongue-shaped member 51 and a hip belt 4. The tongue-shaped member 51 is intended to be fastened to the hip belt 4, e.g. by means of welding, gluing, sewing, riveting, and/or stapling. In one embodiment, the tongue-shaped member 51 is fastened to the hip belt 4 behind a panel 8 thereon to hide it from view. The panel 8 also provides protection of the tongue-shaped member 51.

Figure 3A:
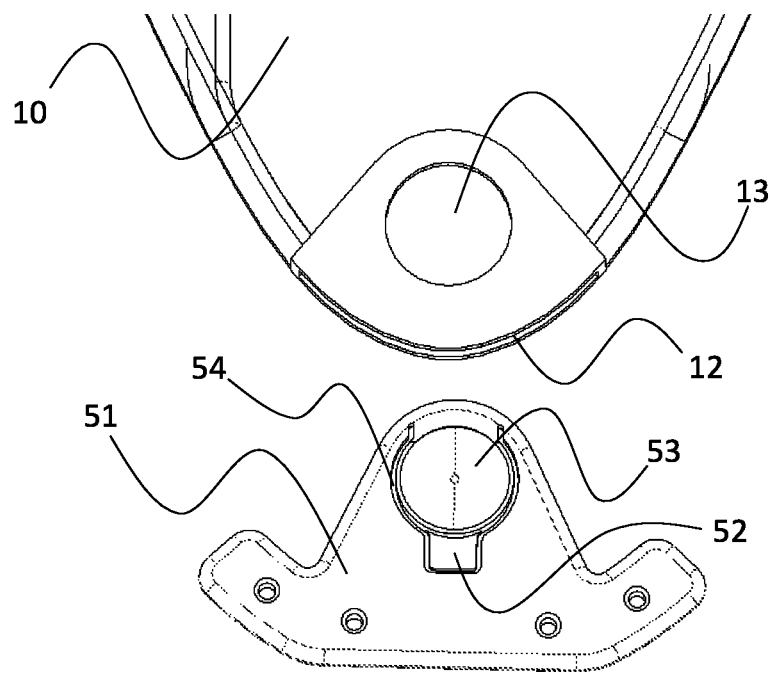
FIGS. 3a and 3b show face views of a pivotal connection joint forming part of a carrier assembly according to the present invention in a disconnected and connected position, respectively.
Figure 3B:
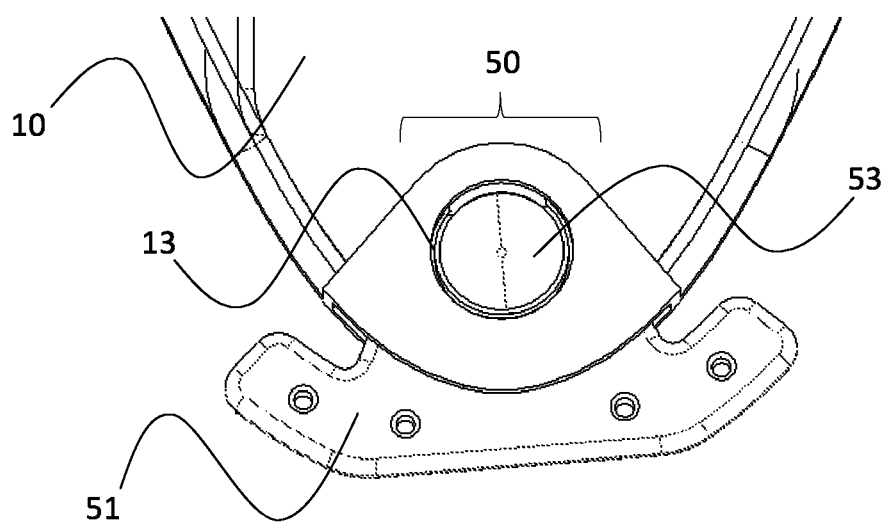

Turning now to FIGS. 3a and 3b, close-up views of the lower portion of the back plate 10 and the tongue-shaped member 51 illustrate the pivotal connection joint 50 of the carrier assembly according to the present invention in a disconnected and connected position, respectively. The pivotal connection joint 50 is created by a recess 11 (shown in FIG. 4) formed in the back plate 10 and defining a cavity adapted to accommodate the tongue-shaped member 51 therein.

The tongue-shaped member 51 comprises a resilient tab 52 having a protruding boss 53 which projects above the surface of the tongue-shaped member 51. The boss 53 is adapted to protrude through a hole 13 in the recess 11 when the tongue-shaped member 51 is received in the cavity of the recess 11, thus forming the pivotal connection joint 50. The hole 13 is substantially circular in shape, matching the substantially circular shape of the boss 53 to give a smooth pivotal movement of the back plate 10 with respect to the hip belt 4. The resilient tab 52 is formed e.g. by a through-going slit 54 in the tongue-shaped member 51 which outlines the circumference of the boss 53.

Figure 4:
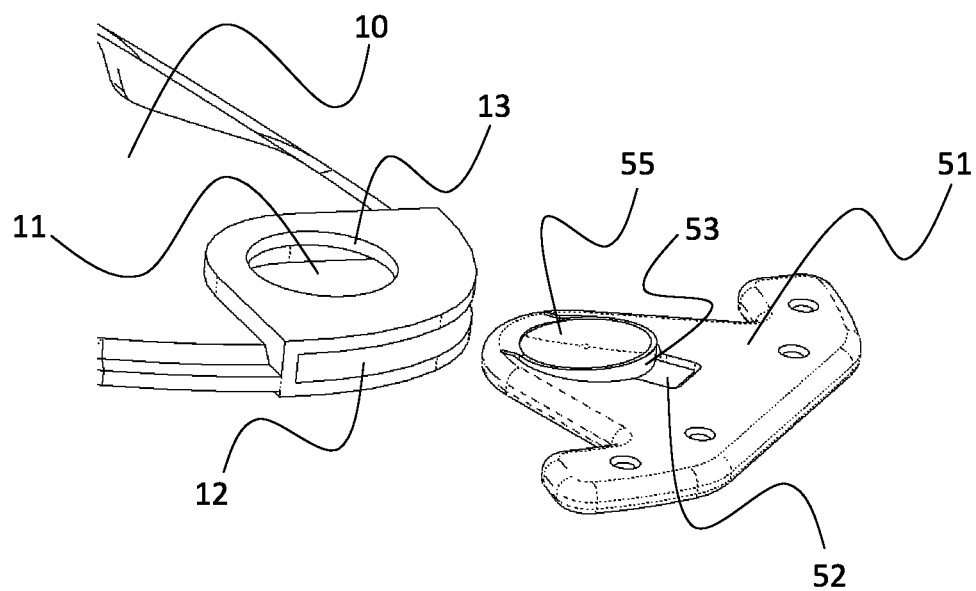
FIG. 4 shows a perspective view of the pivotal connection joint of FIGS. 3a and 3b in a disconnected position.

FIG. 4 illustrates the carrier assembly according to the present invention in a perspective view in a disconnected position of the pivotal connection joint 50. As may be seen in the figure, the boss 53 protrudes above the surface of the tongue-shaped member 51. Furthermore, the top surface 55 of the boss 53 is slanted downwardly in an insertion direction of the tongue-shaped member 51 into the recess 11 through the opening 12.

In use, the operator connects the pivotal connection joint 50 by inserting the tongue-shaped member 51 into the recess 11 through the opening 12. During insertion, the inner surface of the recess 11 comes into contact with the slanted top surface 55 of the boss 53 to depress the resilient tab 52. As the operator continues to push the tongue-shaped member 51 into the recess 11, the boss 53 becomes aligned with the hole 13. As soon as the trailing edge of the boss 53 has moved past the rim of the hole 13, the resilient tab 52 springs back from its depressed position to move the boss 53 into locking engagement with the hole 13 to complete the pivotal connection joint 50. The back plate 10 is now free to pivot about an axis perpendicular to the plane defined by the back plate 10, i.e. by pivoting about the boss 53. In one embodiment, the recess 11 is dimensioned to allow pivotal movement of the tongue-shaped member 51 in the range ±15°, preferably ±10° with respect to a central position.

If the operator instead desires to wear only the hip belt 4, the back plate 10 may be disconnected from the hip belt simply by depressing the boss 53 to disengage it from the hole 13 and removing the tongue-shaped member 51 from the recess 11.

The invention claimed is:

1. A carrier assembly for a harness for carrying a handheld motor-driven work tool, the carrier assembly comprising a back plate including connections for shoulder straps, a hip belt, and means for attaching the work tool, characterized in that the back plate is arranged to be connected to the hip belt by means of a pivotal connection joint to allow rotation about an axis substantially perpendicular to a plane defined by the back plate;

wherein the back plate comprises a recess defining a cavity adapted to receive a corresponding tongue-shaped member arranged on the hip belt and the recess further comprises a hole adapted to receive a corresponding protruding boss arranged on a resilient tab on the tongue-shaped member in a snap-fit connection, wherein the back plate is arranged to pivot about the boss on the resilient tab.

2. The carrier assembly according to claim 1, wherein the recess is arranged in a lower portion of the back plate and has an opening facing towards the tongue-shaped member on the hip belt.

3. The carrier assembly according to claim 1, wherein the hole in the recess has a substantially circular shape and the boss on the resilient tab has a corresponding substantially circular shape.

4. The carrier assembly according to claim 1, wherein the resilient tab is biased such that the boss protrudes in a direction substantially perpendicular to a plane defined by the tongue-shaped member.

5. The carrier assembly according to claim 1, wherein the resilient tab is formed by a through-going slit in the tongue-shaped member.

6. The carrier assembly according to claim 1, wherein a top surface of the boss is slanted downwardly in an insertion direction of the tongue-shaped member into the recess.

7. The carrier assembly according to claim 1, wherein the recess is dimensioned to allow pivotal movement of the tongue-shaped member in the range ±15°, preferably ±10° with respect to a central position.

8. The carrier assembly according to claim 1, wherein the tongue-shaped member is fastened to the hip belt by any one of welding, gluing, sewing, riveting, and stapling.

9. The carrier assembly according to claim 1, wherein the tongue-shaped member is fastened to the hip belt underneath a panel such that the pivotal connection joint is hidden from view.

10. The carrier assembly according to claim 1, wherein the pivotal connection joint between the back plate and the hip belt is releasable.

11. A harness comprising a carrier assembly according to claim 1.

* * * * *